United States Patent
Chen

(10) Patent No.: US 11,966,524 B2
(45) Date of Patent: Apr. 23, 2024

(54) TOUCH CONTROL SYSTEM AND SENSING METHOD THEREOF AND ACTIVE PEN

(71) Applicant: SILICON INTEGRATED SYSTEMS CORPORATION, Hsinchu (TW)

(72) Inventor: Han-ning Chen, Hsinchu (TW)

(73) Assignee: SILICON INTEGRATED SYSTEMS CORPORATION, Hsinchu (TW)

( * ) Notice: Subject to any disclaimer, the term of this patent is extended or adjusted under 35 U.S.C. 154(b) by 0 days.

(21) Appl. No.: 17/809,693

(22) Filed: Jun. 29, 2022

(65) Prior Publication Data
US 2023/0004233 A1    Jan. 5, 2023

(51) Int. Cl.
G06F 3/038 (2013.01)
G06F 3/0354 (2013.01)
G06F 3/041 (2006.01)
G06F 3/16 (2006.01)
G06F 3/044 (2006.01)

(52) U.S. Cl.
CPC .......... G06F 3/038 (2013.01); G06F 3/03545 (2013.01); G06F 3/04162 (2019.05); G06F 3/167 (2013.01); G06F 3/0446 (2019.05)

(58) Field of Classification Search
CPC . G06F 3/03545; G06F 3/04162; G06F 3/0442
See application file for complete search history.

(56) References Cited

U.S. PATENT DOCUMENTS

| | | | |
|---|---|---|---|
| 2004/0080622 A1* | 4/2004 | Gombert | G06F 3/16 348/207.99 |
| 2013/0016055 A1* | 1/2013 | Chuang | G06F 3/0393 345/173 |
| 2014/0362024 A1* | 12/2014 | Hicks | G06F 1/1698 345/174 |
| 2015/0054783 A1* | 2/2015 | Curtis | G06F 3/0441 345/174 |
| 2020/0142562 A1* | 5/2020 | Chen | G06F 3/03545 |
| 2021/0240286 A1* | 8/2021 | Byeon | G06F 3/0383 |
| 2021/0303087 A1* | 9/2021 | Vanka | G06F 3/0487 |
| 2022/0197436 A1* | 6/2022 | Perreault | G06F 3/044 |

FOREIGN PATENT DOCUMENTS

| | | |
|---|---|---|
| CN | 109213342 A | 1/2019 |
| TW | 201303655 A | 1/2013 |
| TW | 201734722 A | 10/2017 |

OTHER PUBLICATIONS

Office Action for Invention issued in corresponding Taiwan Patent Application No. 110124411 dated Jan. 17, 2022, pp. 1-6.

\* cited by examiner

*Primary Examiner* — Koosha Sharifi-Tafreshi
(74) *Attorney, Agent, or Firm* — PV IP PC; Wei Te Chung; Zhigang Ma

(57) ABSTRACT

A touch control system includes: a touch panel; an active pen having a plurality of functions, the functions being used for controlling the active pen or the touch panel and initiated only by at least one voice signal, the active pen including: a voice receiving module configured to receive the at least one voice signal; a voice analyzing module configured to analyze the at least one voice signal to generate a controlling command; and a control module configured to determine that the controlling command is configured to control the active pen or the touch panel; and a touch controller electrically connected to the touch panel and receive, in response to the controlling command being configured to control the touch panel, the controlling command.

7 Claims, 2 Drawing Sheets

TOUCH CONTROL SYSTEM AND SENSING METHOD THEREOF AND ACTIVE PEN

CROSS-REFERENCE TO RELATED APPLICATIONS

This application claims the priority of Taiwan Patent Application No. 110124411, filed on Jul. 2, 2021, the disclosure of which is incorporated herein by reference in its entirety.

TECHNICAL FIELD OF DISCLOSURE

The present disclosure relates to the touch control technology field, and more particularly to a touch control system and sensing method thereof and an active pen.

BACKGROUND OF DISCLOSURE

In order to add or expand at least one function of a conventional active pen, at least one button is disposed on the active pen. One button can correspond to one function, such as setting a color. When the active pen includes only one button, only one function can be added or expanded. When multiple functions need to be added or expanded, a number of required buttons must also be increased accordingly. However, disposing buttons on the active pen destroys mechanical strength of the active pen, and thus a mechanical design of the active pen is more complicated. Furthermore, disposing more buttons not only increases cost of the active pen, but also makes internal circuits of the active pen more complicated. In addition, in the prior art, information of functions corresponding to buttons must be transmitted to a touch panel through a wireless communication module of the active pen. Disposing the wireless module also increases the cost and power consumption of the active pen.

Therefore, there is a need to solve the above-mentioned problems in the prior art.

SUMMARY OF DISCLOSURE

An objective of the present disclosure is to provide a touch control system and sensing method thereof and an active pen capable of solving the problems in the prior art.

The touch control system of the present disclosure includes: a touch panel; an active pen having a plurality of functions, wherein the functions are used for controlling the active pen or the touch panel and initiated only by at least one voice signal, and the active pen includes: a voice receiving module configured to receive the at least one voice signal; a voice analyzing module configured to analyze the at least one voice signal to generate a controlling command; and a control module configured to determine that the controlling command is used for controlling the active pen or the touch panel; and a touch controller electrically coupled to the touch panel and configured to receive, in response to the controlling command used for controlling the touch panel, the controlling command.

In a sensing method of a touch control system of the present disclosure, the touch control system includes a touch panel, an active pen, and a touch controller. The active pen includes a voice receiving module, a voice analyzing module, and a control module. The active pen has a plurality of functions. The functions are used for controlling the active pen or the touch panel and initiated only by at least one voice signal. The sensing method of the touch control system includes: receiving the at least one voice signal by the voice receiving module; analyzing the at least one voice signal to generate a controlling command by the voice analyzing module; determining that the controlling command is used for controlling the active pen or the touch panel by the control module; and receiving, in response to the controlling command used for controlling the touch panel, the controlling command by the touch controller.

An active pen of the present disclosure has a plurality of functions. The functions are used for controlling the active pen or a touch panel and initiated only by at least one voice signal. The active pen includes: a voice receiving module configured to receive the at least one voice signal; a voice analyzing module configured to analyze the at least one voice signal to generate a controlling command; and a control module configured to determine that the controlling command is used for controlling the active pen or the touch panel.

In the touch control system and the sensing method thereof of the present disclosure, the functions of the active pen can be activated only by the at least one voice signal instead of being activated by buttons. Since the functions are not initiated by the buttons, a mechanical design of the active pen can be simplified and cost of the active pen can be reduced. Furthermore, a number of the functions is not limited by the buttons, the functions of the active pen can be expanded as long as the at least one voice signal can be analyzed. Finally, the control module of the present disclosure uses the protocol between the active pen and the touch controller to transmit the controlling command to the touch controller via the sensing electrode and the touch panel. Accordingly, the active pen does not need a Wi-Fi communication module or a BLUETOOTH module. The cost and power consumption of the active pen can be saved.

DETAILED DESCRIPTION OF DISCLOSURE

To make the objectives, technical schemes, and technical effects of the present disclosure more clearly and definitely, the present disclosure will be described in detail below by using embodiments in conjunction with the appending drawings. It should be understood that the specific embodiments described herein are merely for explaining the present disclosure, and as used herein, the term "embodiment" refers to an instance, an example, or an illustration but is not intended to limit the present disclosure. In addition, the articles "a" and "an" as used in the specification and the appended claims should generally be construed to mean "one or more" unless specified otherwise or clear from the context to be directed to a singular form. Also, in the appending drawings, the components having similar or the same structure or function are indicated by the same reference number.

Figure 1:
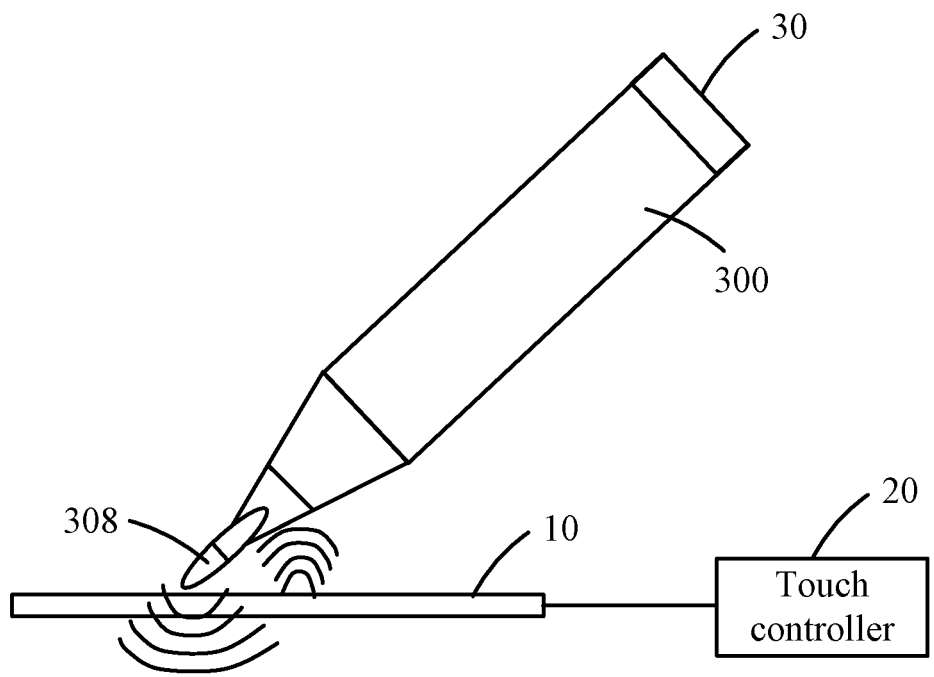
FIG. 1 illustrates a touch control system in accordance with an embodiment of the present disclosure.
Figure 2:
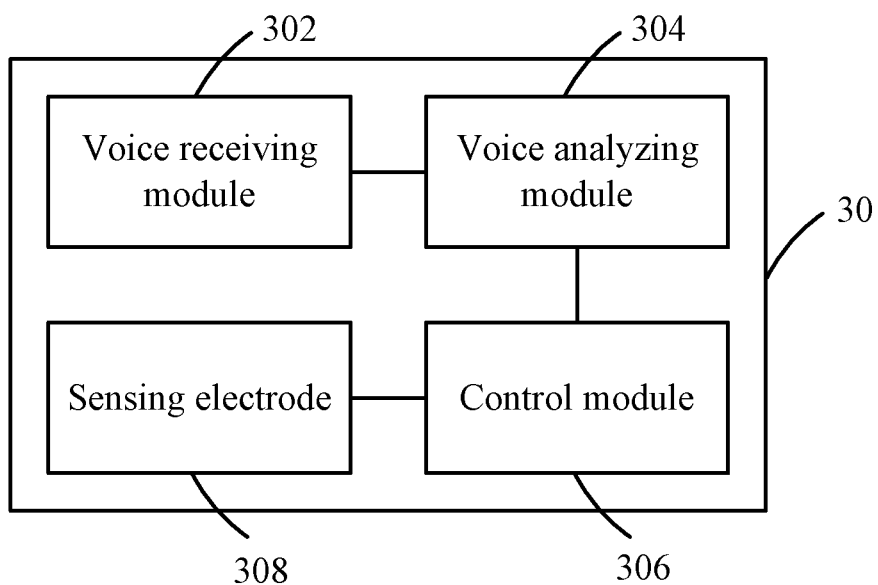
FIG. 2 illustrates a block diagram of an active pen in accordance with an embodiment of the present disclosure.

Please refer to FIG. 1 and FIG. 2. FIG. 1 illustrates a touch control system in accordance with an embodiment of the present disclosure. FIG. 2 illustrates a block diagram of an active pen 30 in accordance with an embodiment of the present disclosure.

The touch control system includes a touch panel 10, a touch controller 20, and the active pen 30.

The touch panel 10 generally includes a plurality of electrodes arranged in a matrix and a plurality of conductive wires connected to the electrodes. These electrodes are made of indium tin oxide (ITO) and have a bar or diamond shape. In a mutual capacitance framework, these electrodes include a plurality of driving electrodes and a plurality of sensing electrodes. Correspondingly, the conductive wires also include a plurality of driving wires and a plurality of sensing wires. The driving wires are respectively connected to the corresponding driving electrodes. The sensing wires are respectively connected to the corresponding sensing electrodes. In a driving scheme of the mutual capacitance framework, a panel driving signal is sequentially applied to the driving electrodes via the driving wires. The panel driving signal is usually a pulse signal. Correspondingly, a sensing signal is read from the sensing electrodes via the sensing wires.

The active pen 30 is configured to generate a signal. The touch controller 20 is electrically coupled to the touch panel 10 and configured to detect the signal. The signal, for example, is generated when the active pen 30 touches the touch panel 10. That is, the signal is a touch signal or a pressure sensing value. Alternatively, the signal is generated when the active pen 30 hovers on the touch panel 10. That is, the signal is a hover signal. Alternatively, the signal is a controlling command which is generated after the active pen 30 receives at least one voice signal. That is, the touch controller 20 is configured to detect whether at least one of the touch signal, the pressure sensing value, the hover signal, and the controlling command is received.

The active pen 30 has a plurality of functions. The functions are used for controlling the active pen 30 or the touch panel 10 and initiated only by at least one voice signal and cannot be initiated by any other method, such as a button. The active pen 30 includes a case 300, a voice receiving module 302, a voice analyzing module 304, a control module 306, and a sensing electrode 308.

The case 300 has a hollow structure. The voice receiving module 302, the voice analyzing module 304, and the control module 306 are disposed in the case 300. The sensing electrode 308 is disposed at a position extending from one end of the case 300 outwardly.

A feature of the active pen 30 of the present disclosure is that the functions of the active pen 30 are initiated only by the at least one voice signal instead of being initiated by buttons. Since the functions are not initiated by the buttons, a mechanical design of the active pen 30 can be simplified and cost of the active pen 30 can be reduced. Furthermore, a number of the functions is not limited by the buttons, the functions of the active pen 30 can be expanded as long as the at least one voice signal can be analyzed.

The voice receiving module 302 is configured to receive the at least one voice signal. The voice receiving module 30 can be a microphone or a microphone array.

The voice analyzing module 304 is electrically connected to the voice receiving module 302 and configured to analyze the at least one voice signal to generate a controlling command.

The control module 306 is electrically connected to the voice analyzing module 304 and configured to determine that the controlling command is used for controlling the active pen 30 or the touch panel 10.

When the sensing electrode 308 touches the touch panel 10, the sensing electrode 308 is configured to transmit a signal to the touch controller 20 via the touch panel 10. As such, the touch controller 20 can obtain at least one of the touch signal, the pressure sensing value, the hover signal, and the controlling command according to the signal.

In one embodiment, the control module 306 is configured to control, in response to the controlling command used for controlling the active pen 30, the active pen 30 to perform a power control function.

The power control function is used for controlling power of the active pen 30 and includes but is not limited to a power-on function, a power-off function, a wake-up function, or a sleep function. The power-on function is used for turning on the power of the active pen 30. The power-off function is used for turning off the power of the active pen 30. The wake-up function is used for waking up the active pen 30 from a sleep mode. The sleep function is used for controlling the active pen 30 to enter the sleep mode.

In another embodiment, the control module 306 is configured to control, in response to the controlling command used for controlling the active pen 30, the active pen 30 to perform a protocol switching function.

The protocol switching function is used for controlling the active pen 30 to switch to a protocol suitable for the touch controller 20. In detail, the control module 306 can communicate with touch controllers having different protocols.

In yet another embodiment, the touch controller 20 is configured to receive, in response to the controlling command used for controlling the touch panel 10, the controlling command generated by the voice analyzing module 304. In detail, in response to the controlling command used for controlling the touch panel 10, the control module 306 uses a protocol between the active pen 30 and the touch controller 20 to transmit the controlling command to the touch controller 20 via the sensing electrode 308 and the touch panel 10. The touch controller 20 is configured to perform an operation of the active pen 30 on the touch panel 10 according to the controlling command.

The operation includes setting a color of the active pen 30, setting a stroke width of the active pen 30, setting a form of the active pen 30, performing an erase operation, performing a right-click operation or the like. Setting the color of the active pen 30 is used for changing the color of the active pen 30 displayed on the touch panel 10. Setting the stroke width of the active pen 30 is used for changing the stroke width of the active pen 30 on the touch panel 10. Setting the form of the active pen 30 is used for changing the form of the active pen 30 on the touch panel 10, such as an ink pen, a pencil, a brush, a chisel marker, or a highlighter.

When the control module 306 determines that the controlling command is used for controlling the active pen 30, the control module 306 does not transmit the controlling command to the touch controller 20. That is, the touch controller 20 does not receive the controlling command. The touch controller 20 continuously detects whether a controlling command used for controlling the touch panel 10 is received.

It can be seen from the above that the control module 306 of the present disclosure uses the protocol between the active pen 30 and the touch controller 20 to transmit the controlling command to the touch controller 20 via the sensing electrode 308 and the touch panel 10. Accordingly, the active pen 30 does not need a Wi-Fi (Wireless Fidelity) communication module or a BLUETOOTH module. In conclusion, the touch control system of the present disclosure can save the cost and power consumption of the active pen 30.

Figure 3:
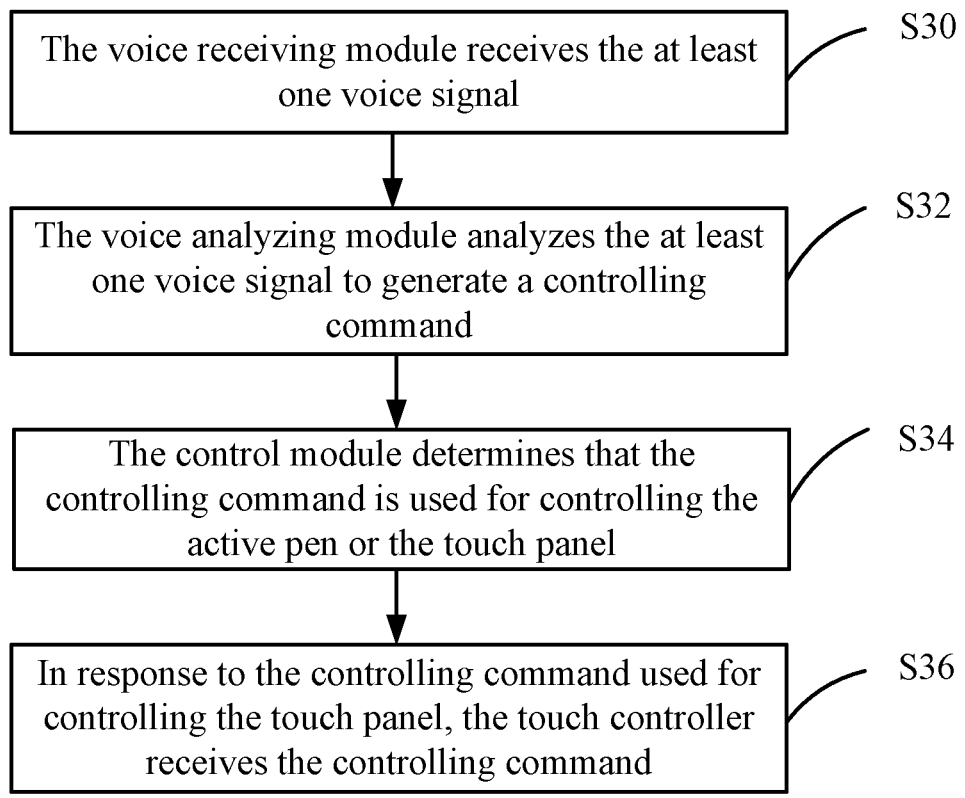
FIG. 3 illustrates a flowchart of a sensing method of a touch control system in accordance with an embodiment of the present disclosure.

Please refer to FIG. 3. FIG. 3 illustrates a flowchart of a sensing method of a touch control system in accordance with an embodiment of the present disclosure.

The touch control system includes a touch panel, an active pen, and a touch controller. The active pen includes a voice receiving module, a voice analyzing module, and a control module. The active pen has a plurality of functions. The functions are used for controlling the active pen or the touch panel and initiated only by at least one voice signal. The sensing method of the touch control system includes the following operations.

In operation S30, the voice receiving module receives the at least one voice signal.

In operation S32, the voice analyzing module analyzes the at least one voice signal to generate a controlling command.

In operation S34, the control module determines that the controlling command is used for controlling the active pen or the touch panel.

In one embodiment, the control module is configured to control, in response to the controlling command used for controlling the active pen, the active pen to perform a power control function. The power control function is used for controlling power of the active pen.

In another embodiment, the control module is configured to control, in response to the controlling command used for controlling the active pen, the active pen to perform a protocol switching function. The protocol switching function is used for controlling the active pen to switch to a protocol suitable for the touch controller.

In yet another embodiment, the active pen further includes a sensing electrode. In response to the controlling command used for controlling the touch panel, the control module transmits the controlling command to the touch controller via the sensing electrode and the touch panel. The touch controller is configured to perform an operation of the active pen on the touch panel according to the controlling command. The control module uses a protocol between the active pen and the touch controller to transmit the controlling command to the touch controller.

In operation S36, in response to the controlling command used for controlling the touch panel, the touch controller receives the controlling command.

In the touch control system and the sensing method thereof of the present disclosure, the functions of the active pen can be activated only by the at least one voice signal instead of being activated by buttons. Since the functions are not initiated by the buttons, a mechanical design of the active pen can be simplified and cost of the active pen can be reduced. Furthermore, a number of the functions is not limited by the buttons, the functions of the active pen can be expanded as long as the at least one voice signal can be analyzed. Finally, the control module of the present disclosure uses the protocol between the active pen and the touch controller to transmit the controlling command to the touch controller via the sensing electrode and the touch panel. Accordingly, the active pen does not need a Wi-Fi communication module or a BLUETOOTH module. The cost and power consumption of the active pen can be saved.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

What is claimed is:

1. A touch control system, comprising:
 a touch panel;
 an active pen having a plurality of functions, wherein the functions are used for controlling the active pen or the touch panel and initiated only by at least one voice signal, and the active pen comprises:
  a case having a hollow structure;
  a voice receiving module disposed in the case and comprising a microphone or a microphone array and configured to receive the at least one voice signal;
  a voice analyzing module electrically connected to the microphone or the microphone array and disposed in the case;
  a control module electrically connected to the voice analyzing module and disposed in the case; and
  a sensing electrode disposed at one end of the active pen; and
 a touch controller electrically coupled to the touch panel and configured to receive, in response to the controlling command used for controlling the touch panel, the controlling command;
 wherein the active pen is configured to generate a controlling command by analyzing the at least one voice signal through the voice analyzing module and to determine, through the control module, that the controlling command is used for controlling the active pen or the touch panel;
 wherein the active pen is configured under control of the control module, in response to the controlling command based on the voice signal for controlling the active pen, to perform a protocol switching function, and the protocol switching function is used for controlling the active pen to switch to a protocol suitable for the touch controller;
 wherein the active pen is configured under control of the control module, in response to the controlling command based on the voice signal for controlling the touch panel, to transmit the controlling command to the touch controller via the sensing electrode and the touch panel, and the touch controller is configured to perform an operation of the active pen on the touch panel according to the controlling command.

2. The touch control system according to claim 1, wherein the active pen is configured under control of the control module, in response to the controlling command used for controlling the active pen, to perform a power control function, and the power control function is used for controlling power of the active pen.

3. The touch control system according to claim 1, wherein the active pen, under control of the control module, uses the protocol between the active pen and the touch controller to transmit the controlling command to the touch controller.

4. A sensing method of a touch control system, the touch control system comprising a touch panel, an active pen, and a touch controller, the active pen comprising a case having a hollow structure, a voice receiving module comprising a microphone or a microphone array, a voice analyzing module electrically to the microphone or the microphone array and disposed in the case, a control module electrically connected to the voice analyzing module and disposed in the case, and a sensing electrode disposed at one end of the active pen, the active pen having a plurality of functions, the functions being used for controlling the active pen or the touch panel and initiated only by at least one voice signal, and the sensing method of the touch control system comprising:

receiving the at least one voice signal by the voice receiving module;

using the active pen to generate a controlling command by analyzing the at least one voice signal through the voice analyzing module;

using the active pen to determine, through the control module, that the controlling command is used for controlling the active pen or the touch panel; and using the touch controller to receive, in response to the controlling command used for controlling the touch panel, the controlling command;

wherein in response to the controlling command based on the voice signal for controlling the active pen, the active pen, under control of the control module, performs a protocol switching function, and the protocol switching function is used for controlling the active pen to switch to a protocol suitable for the touch controller;

wherein in response to the controlling command based on the voice signal for controlling the touch panel, the active pen, under control of the control module, transmits the controlling command to the touch controller via the sensing electrode and the touch panel, and the touch controller is configured to perform an operation of the active pen on the touch panel according to the controlling command.

5. The sensing method of the touch control system according to claim 4, wherein in response to the controlling command, the active is configured, under control of the control module, to perform a power control function, and the power control function is used for controlling power of the active pen.

6. The sensing method of the touch control system according to claim 4, wherein the active pen, under control of the control module, uses the protocol between the active pen and the touch controller to transmit the controlling command to the touch controller.

7. An active pen, having a plurality of functions, wherein the functions are used for controlling the active pen or a touch panel electrically coupled to a touch controller and initiated only by at least one voice signal, and the active pen comprises:

a case having a hollow structure;

a voice receiving module disposed in the case and comprising a microphone or a microphone array and configured to receive the at least one voice signal;

a voice analyzing module electrically connected to the microphone or the microphone array and disposed in the case;

a sensing electrode disposed at one end of the active pen; and a control module electrically connected to the voice analyzing module and disposed in the case;

wherein the active pen is configured under control of the control module, in response to the controlling command based on the voice signal for controlling the active pen, to perform a protocol switching function, and the protocol switching function is used for controlling the active pen to switch to a protocol suitable for the touch controller; and wherein the active pen is further configured under control of the control module, in response to the controlling command based on the voice signal for controlling the touch panel, to transmit the controlling command to the touch controller via the sensing electrode and the touch panel, and the touch controller is configured to perform an operation of the active pen on the touch panel according to the controlling command.

* * * * *

UNITED STATES PATENT AND TRADEMARK OFFICE
CERTIFICATE OF CORRECTION

| | |
|---|---|
| PATENT NO. | : 11,966,524 B2 |
| APPLICATION NO. | : 17/809693 |
| DATED | : April 23, 2024 |
| INVENTOR(S) | : Han-ning Chen |

It is certified that error appears in the above-identified patent and that said Letters Patent is hereby corrected as shown below:

On the Title Page

Add, Item (30) as follows:
(30) Foreign Application Priority Data
Jul. 2, 2021 (TW) .............................. 110124411

Signed and Sealed this
Second Day of July, 2024

*Katherine Kelly Vidal*

Katherine Kelly Vidal
*Director of the United States Patent and Trademark Office*